Oct. 7, 1958     G. E. LESTER ET AL     2,854,746
ARTIFICIAL DENTURE STRUCTURES
Filed Feb. 27, 1956
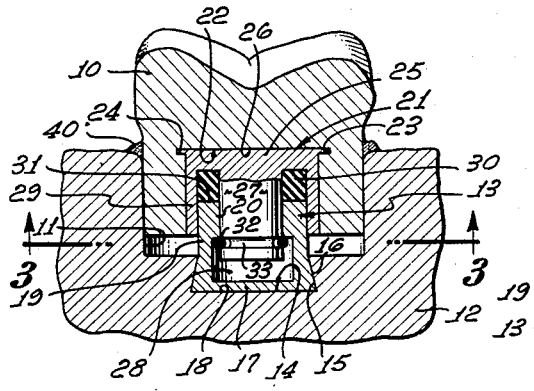
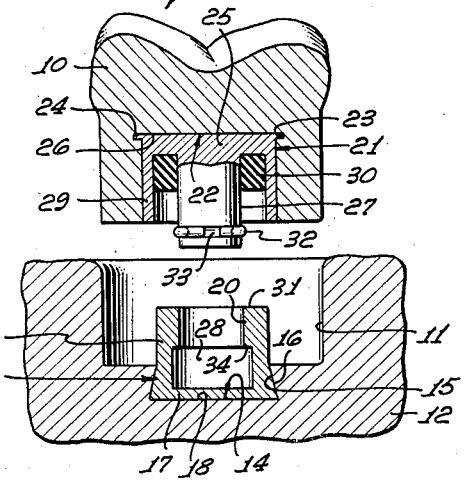
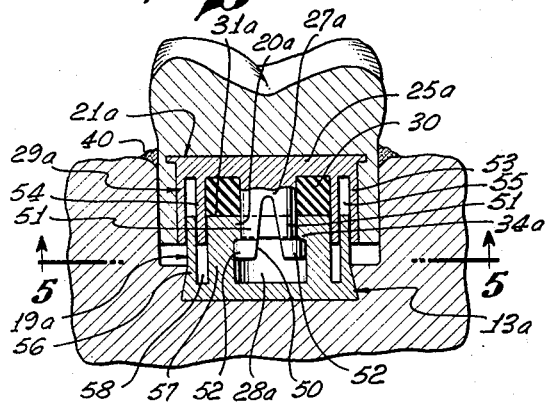
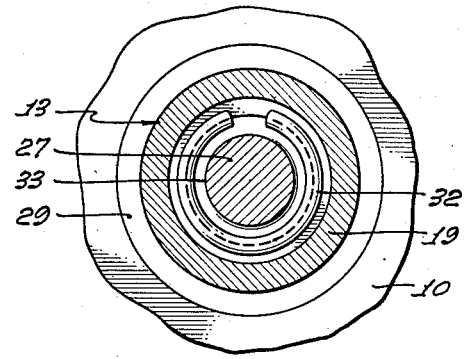
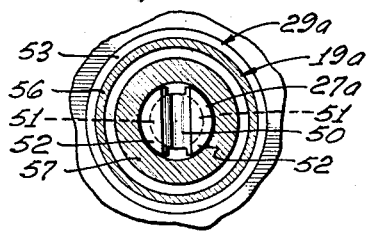
GEORGE E. LESTER,
WILLIAM LESTER,
INVENTORS.
BY
*Bernard Kriegel*
ATTORNEY.

United States Patent Office 2,854,746
Patented Oct. 7, 1958

2,854,746

ARTIFICIAL DENTURE STRUCTURES

George E. Lester, Encino, and William Lester, Burbank, Calif.

Application February 27, 1956, Serial No. 567,961

7 Claims. (Cl. 32—2)

The present invention relates to artificial dentures, and is more particularly directed to the relieving of stress in prosthetic teeth, and in any tooth or teeth adjacent thereto.

An object of the invention is to provide an improved artificial tooth structure capable of yielding under a biting action to minimize the stress in the structure, as well as to prevent the structure from imposing any loads on an adjacent tooth, and to also relieve the loads imposed upon a person's gums.

Another object of the invention is to provide an artificial tooth structure capable of yielding slightly under loads to provide a stress breaker, the structure possessing great strength despite its comparative simplicity.

A further object of the invention is to provide a prosthetic tooth structure capable of yielding under load, which possesses relatively few parts, and which is easy to assemble.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through a form of prosthetic tooth structure, with all of the parts in assembled relation to each other;

Fig. 2 is a view similar to Fig. 1 disclosing the main parts of the device prior to their being placed in assembled relation;

Fig. 3 is an enlarged fragmentary section taken along the line 3—3 on Fig. 1;

Fig. 4 is a view similar to Fig. 1 of another embodiment of the invention;

Fig. 5 is a fragmentary section taken along the line 5—5 on Fig. 4.

In the form of invention illustrated in Figs. 1, 2 and 3, an artificial tooth 10, which may be made of porcelain, plastic or metal, or any other suitable material, is mounted in a cylindrical cavity 11 formed in a denture base 12, that may be made of any suitable material. The tooth 10 is mounted in the denture base in such manner as to be capable of yielding against a resisting force, in effect providing a stress breaker or shock absorber between the tooth and the denture base, as well as between the artificial tooth 10 and an adjacent tooth (not shown).

As specifically shown, the denture base 12 has an inner, generally cup-shaped housing 13 secured therein, the lower portion of the housing being disposed within a recess 14 formed below the cylindrical cavity. The side wall 15 of the recess is tapered in an upward and inward direction, in general being frusto-conical in shape to provide an undercut portion receiving a companion tapering portion 16 of the inner housing, thereby anchoring the inner housing 13 to the denture base 12 by preventing the housing from moving upwardly with respect thereto. The inner housing itself includes a base portion 17 engaging the bottom 18 of the recess, and it also includes a cylindrical portion 19 extending upwardly from the tapered portion of the housing. The tapered portion 16 and the cylindrical portion 19 together constitute a housing wall having an upper, inwardly directed shoulder or flange 20.

An outer housing structure 21 is slidably mounted upon and within the inner housing structure 13, this outer housing structure being mounted within the artificial tooth 10, which has a cylindrical recess or bore 22, terminating within the tooth in a circumferential groove 23 to receive an outwardly directed housing flange 24, which serves to anchor the artificial tooth 10 and housing firmly to one another. The base portion 25 of the housing 21 engages the bottom 26 of the tooth bore, there being a central stud or pin 27 projecting from the base 25 into an enlarged cavity 28 in the inner housing 13 and slidable in the flange 20. Thus, the stud or pin 27 is slidable along the inner wall of the flange 20, whereas the outer wall or skirt 29 of the outer housing is slidable along the cylindrical periphery of the inner housing wall 19. The slidable relation between the parts serves to guide the artificial tooth 10 for straight line movement in an inward or outward direction within the cylindrical cavity 11 in the denture base 12.

Inward movement of the artificial tooth 10 within the cavity 11 is resisted by a spring-like member 30 in the form of a rubber or rubber-like annulus, which is disposed within the annular space between the stud 27 and the outer wall 29 of the outer housing structure, the rubber spring-like member 30 engaging the base 25 of the outer housing and the end 31 of the inner housing 13. The rubber spring-like member 30 is preferably under some compression when the parts are fully assembled, tending to resist inward movement of the artificial tooth 10 and the outer housing 21 secured thereto within the denture base 12 and with respect to the inner housing 13.

When a load, such as incident to a biting action, occurs on the artificial tooth 10, it tends to move inwardly of the denture base 12 against the force of the rubber or rubber-like spring member 30. When such load is relieved, the spring member 30 will return the artificial tooth 10 to its initial position. Such return or outward movement of the artificial tooth is limited by engagement of a split inherently expansible retainer ring 32, disposed within a peripheral groove 33 in the stud or pin 27, with the underside or shoulder 34 of the inwardly directed flange 20 constituting part of the inner housing 13.

In producing the artificial denture structure, the denture base or inner tooth portion 12 is cast around the inner housing member 13, being secured firmly thereto by the coaction between the tapering walls and surfaces 15, 16. The artificial tooth 10 is cast around the outer housing member 21; the spring resisting annulus 30 is inserted in place against the base 25 of this member; and the expansible retainer ring 32 placed within the groove 33 in the stud or pin 27. The parts then occupy the relative positions disclosed in Fig. 2. The artificial tooth and housing combination 10, 21, with the rubber spring member 30 and retainer ring 32 in place, are then moved within the denture base cavity 11, the stud or pin 27 entering the central opening in the housing flange 20, the wall of which forces the retainer ring 32 inwardly within its groove 33 to the extent at which the ring will slide along the inner wall of the flange, which is also true of the stud 27. During such sliding action of the ring 32 and stud 27, the outer wall 29 of the outer housing passes over the wall or periphery 19 of the inner housing. The annular spring member 30 will engage the end of the inner housing 13, whereupon a slight additional movement of the tooth 10 and its outer housing 21 into the denture base cavity 11 will dispose the retainer ring 32 below the shoulder 34 and allow the ring to expand or snap outwardly into a position in engagement with the shoulder 34. When so engaged, the retainer ring 32 prevents outward removal of the artificial tooth 10 and outer housing 21 with respect to the denture base 12 and the inner housing 13, effectively holding all of the parts in assembled relation, with the rubber annulus 30 under compression.

To insure against food particles and other substances from entering the denture base cavity 11, a suitable elastic sealing material 40 may be placed around the exterior of the tooth 10 and end portion of the denture base 12. Such sealing material has sufficient elasticity to continue functioning as a seal despite relatively slight movement of the artificial tooth 10 relative to the denture base 12.

The form of invention disclosed in Figs. 4 and 5 is essentially the same as the embodiment illustrated in Figs. 1, 2 and 3, except that a greater guiding surface is provided between the inner and outer housings 13a, 21a. Also, a specifically different mode of securing the outer housing and the tooth attached thereto to the inner housing is provided. As illustrated in Fig. 4, the central stud or pin 27a is provided with a longitudinal slot 50 extending completely therethrough, to form opposed spring-like legs 51 which tend to expand inherently in an outward direction. These legs terminate in outwardly directed foot portions 52, which are adapted to fit under the shoulder 34a of the inner housing 13a.

The outer wall 29a of the outer housing is formed with an outer wall portion 53 and an inner wall portion 54 spaced therefrom to provide an annular space 55 therebetween opening in a downward direction. The inner housing wall 19a is also formed in two portions, including an outer wall portion 56 and an inner wall portion 57 spaced therefrom to provide an annular space 58 in which the inner wall portion 53 of the outer housing is slidable, the outer wall 56 of the inner housing being slidable within the annular space 55 of the outer housing. It is evident from an inspection of Fig. 4, that both the inner and outer surfaces of the inner wall portion 54 of the outer housing are slidable along and are guided by the outer surface of the inner wall portion 57 and the inner surface of the outer wall portion 56 of the inner housing member. In a similar manner, the outer wall portion 56 of the inner housing is slidable along and is guided by the outer surface of the inner wall portion 54 and the inner surface of the outer wall portion 53 of the outer housing. The manner of guiding the housing members 13a, 21a with respect to each other, as disclosed in Fig. 4, provides a much greater bearing surface to prevent tilting of the artificial tooth 10 with respect to the denture base 12, guiding such tooth for movement along a straight line path, which is the axis of the housings. Of course, the stud or pin 27a is slidable along the inner wall of the flange 20a to also guide the artificial tooth and outer housing in its movement, and to maintain the latter in a centered position with respect to the denture base 12 and the inner housing member 13a.

In assembling the artificial denture structure disclosed in Fig. 4, the inner housing member 13a is secured to the denture or tooth base 12 and the outer housing member 21a is mounted within the artificial tooth 10. The rubber or pliant, elastic spring-like member 30 is then placed in position within the annular space 27a between the stud and the housing wall portion 54 and against the base 25a of the outer housing. The legs 51 are then sprung inwardly toward each other to an extent in which their foot portions 52 will pass into and through the bore of the inner housing flange 20a, the tooth 10 and outer housing 21a then being moved toward the inner housing 13a and within the housing cavity 28a, with the inner wall portion 54 of the outer housing sliding within the annular space 58 in the inner housing, and the outer wall portion 56 of the inner housing sliding within the annular space 55 of the outer housing. The parts are moved inwardly with respect to each other until the pliant, elastic annulus 30 engages the end 31a of the inner housing, whereupon a slight additional movement will dispose the stud feet 52 below the shoulder 34a and allow the legs to spring inherently in an outward direction, to bring the feet under and in engagement with the shoulder 34a, with the leg portions 51 of the stud engaging the inner surface of the inner housing flange 20a. The annular clearance space between the tooth 10 and the denture base 12 may be then filled with a suitable elastic sealing material 40, in the same manner as in the other form of the invention.

When a load is imposed upon the artificial tooth 10, it can move inwardly if such load is sufficient to overcome the spring force of the annular elastic member 30. Such member will allow the tooth to yield or shift inwardly of the denture base 12 to a slight extent when the load is sufficient. When the load is relieved the spring member 30 moves the tooth 10 to its initial position, as determined by engagement with retaining foot portions 52 of the stud with the shoulder 34a of the outer housing. During such inward and outward movement of the tooth relative to the denture base, the different wall portions slide upon each other to insure a larged guided surface, preventing any binding action of the inner and outer housings 13a, 21a upon each other, insuring straight line central movement of the artificial tooth 10 relative to the denture or tooth base 12.

In both forms of the invention, it is evident that a comparatively simple arrangement has been provided for yieldably mounting an artificial tooth so that it can move to a limited extent under restraint. Such movement will occur independently of an adjacent tooth, which could be another artificial tooth or an anchor tooth. Each artificial tooth moves independently of any adjacent tooth in a straight line direction, in which it is postively guided, to prevent the existence of any bending action that would otherwise be imposed on the tooth, as well as on any adjacent teeth. As the load on the tooth increases, as may occur under a biting action, the resistance to movement of the artificial tooth increases, which will insure a proper action against an opposed tooth, and on any substances between such opposed tooth and the artificial tooth.

Inasmuch as the tooth is yieldable and movable independently of any other tooth under load, the structure provides a stress breaker, preventing, or at least minimizing greatly, the tendency for adjacent anchor or abutment teeth to drift from their normal positions. The yieldable mounting of the tooth also relieves the pressure on a person's gums and also the shock that would be imposed thereon in the event that the artificial tooth were rigidly mounted with respect to the adjacent teeth in a person's mouth. The mouth structure is very easy to assemble, it merely being necessary to snap the artificial tooth 10, its housing 21 or 21a, rubber spring or cushioning member 30, and retainer device 32 or 51, 52 into the cavity 11 in the denture base 12 and the cavity 28 or 28a in the inner housing 13 or 13a, after which, if desired, the elastic sealing material 40 is placed around the artificial tooth and against its exterior surface and the adjacent denture base.

The inventors claim:

1. In prosthetic tooth structures: a denture base; an artificial tooth; a housing member secured to said base; a housing member secured to said tooth; one of said members having a central pin secured thereto and an inner wall spaced from said pin to provide an annular chamber therebetween; the other of said members having a central bore receiving said pin and a wall slidable along the inner wall of said one member; spring means in said chamber engaging said members to resist movement of said tooth in a direction inwardly of said base; and retainer means for limiting movement of said tooth in a direction outwardly of said base.

2. In prosthetic tooth structures: a denture base; an artificial tooth; a housing member secured to said base; a housing member secured to said tooth; one of said members having a central pin and a wall spaced from said pin to provide an annular chamber therebetween; the other of said members having a central bore receiving said pin and a wall slidable along the wall of said one member; spring means in said chamber engaging said members to resist movement of said tooth in a direction inwardly of said base; and expansible retainer means on said pin engaging said other member to limit movement of said tooth in a direction outwardly of said base.

3. In prosthetic tooth structures: a denture base; an artificial tooth; a housing member secured to said base; a housing member secured to said tooth; one of said members having a central pin and a wall spaced from said pin to provide an annular chamber therebetween; the other of said members having a central bore receiving said pin and a wall slidable along the wall of said one member; a pliant, elastic annulus in said chamber engaging said members to resist the movement of said tooth in a direction inwardly of said base; and expansible retainer means on said pin engaging said other members to limit movement of said tooth in a direction outwardly of said base.

4. In prosthetic tooth structures: a denture base; an artificial tooth; a housing member secured to said base; a housing member secured to said tooth; one of said members having a central pin and a wall spaced from said pin to provide an annular chamber therebetween; the other of said members having a central bore receiving said pin and a wall slidable along the wall of said one member; said other member having a transverse shoulder in said bore; a pliant, elastic annulus in said chamber engaging said members to resist movement of said tooth in a direction inwardly of said base; said pin having a peripheral groove; and a split, expansible ring in said groove engaging said shoulder to limit movement of said tooth in a direction outwardly of said base.

5. In prosthetic tooth structures: a denture base; an artificial tooth; a housing member secured to said base; a housing member secured to said tooth; one of said members having a central pin and a wall spaced from said pin to provide an annular chamber therebetween; the other of said members having a central bore receiving said pin and a wall slidable along the wall of said one member; said other member having a transverse shoulder in said bore; a pliant, elastic annulus in said chamber engaging said member to resist movement of said tooth in a direction inwardly of said base; said pin including expansible legs thereon terminating in outwardly directed portions engageable with said shoulder to limit movement of said tooth in a direction outwardly of said base.

6. In prosthetic tooth structures: a denture base, an artificial tooth; a housing member secured to said base; a housing member secured to said tooth; one of said members having a central pin, an inner wall portion spaced from said pin to provide an annular chamber therebetween, and an outer wall portion spaced from said inner wall portion to provide an annular space therebetween; the other of said members having a central bore receiving said pin, an inner wall in said chamber and an outer wall disposed in said annular space and spaced from said inner wall to provide an annular space receiving said inner wall portion; a pliant, elastic annulus in said chamber compressed between said one member and said inner wall to resist movement of said tooth in a direction inwardly of said base; and retainer means for limiting movement of said tooth in a direction outwardly of said base.

7. In prosthetic tooth structures: a denture base; an artificial tooth, a housing member secured to said base; a housing member secured to said tooth; one of said members having a central pin, an inner wall portion spaced from said pin to provide an annular chamber therebetween, and an outer wall portion spaced from said inner wall portion to provide an annular space therebetween; the other of said members having a central bore receiving said pin, an inner wall in said chamber and an outer wall disposed in said annular space and spaced from said inner wall to provide an annular space receiving said inner wall portion; a pliant, elastic annulus in said chamber compressed between said one member and said inner wall to resist movement of said tooth in a direction inwardly of said base; said other member having a transverse shoulder in said bore; said pin including expansible legs thereon terminating in outwardly directed portions engageable with said transverse shoulder to limit movement of said tooth in a direction outwardly of said base.

References Cited in the file of this patent

FOREIGN PATENTS 838,476    Germany _____ May 8, 1952